United States Patent
Weiss et al.

(10) Patent No.: US 7,255,979 B2
(45) Date of Patent: Aug. 14, 2007

(54) LENTICULAR PRINTING

(75) Inventors: Alex Weiss, Kadima (IL); Nissim Pilossof, Rehovot (IL)

(73) Assignee: Kodak Il Ltd., Petach Tikva (IL)

( * ) Notice: Subject to any disclaimer, the term of this patent is extended or adjusted under 35 U.S.C. 154(b) by 657 days.

(21) Appl. No.: 10/791,726

(22) Filed: Mar. 4, 2004

(65) Prior Publication Data

US 2004/0197715 A1    Oct. 7, 2004

Related U.S. Application Data

(60) Provisional application No. 60/458,976, filed on Apr. 1, 2003.

(51) Int. Cl.
*G03C 5/00* (2006.01)

(52) U.S. Cl. .................................. 430/321; 430/946

(58) Field of Classification Search ................ 430/946
See application file for complete search history.

(56) References Cited

U.S. PATENT DOCUMENTS

| | | | |
|---|---|---|---|
| 5,302,989 A * | 4/1994 | Taguchi et al. ............... 355/22 |
| 5,424,553 A | 6/1995 | Morton | |
| 5,959,718 A | 9/1999 | Morton | |
| 6,486,937 B2 | 11/2002 | Morton et al. | |

* cited by examiner

*Primary Examiner*—John A. McPherson
(74) *Attorney, Agent, or Firm*—Nelson Adrian Blish

(57) ABSTRACT

A method of producing Lenticular images and a system for carrying out the method, in which photosensitive material is placed in contact with a Lenticular sheet and exposed through the Lenticular sheet lenses. An additional lens-array is placed between the optical imaging system and the Lenticular sheet, with lenses having power only in one direction.

9 Claims, 7 Drawing Sheets

LENTICULAR PRINTING

CROSS-REFERENCE TO RELATED PATENT APPLICATIONS

This patent application claims priority from and is related to U.S. Provisional Patent Application Ser. No. 60/458,976, filed 1 Apr. 2003, this U.S. Provisional Patent Application is incorporated by reference in its entirety herein.

FIELD OF THE INVENTION

The present invention is related to Lenticular printing, and more specifically to Lenticular printing by direct exposure of photosensitive material laminated on the Lenticular sheet.

BACKGROUND OF THE INVENTION

Lenticular images can be generally realized in one of three ways: 1) by using traditional methods of printing or photography on some kind of image carrier (paper, polymer sheet, etc.), followed by alignment and attachment of a Lenticular sheet to the image; or 2) by direct printing of an interlaced image on the back side of Lenticular lenses; or 3) by direct exposure of photosensitive material laminated on the Lenticular sheet. The present invention is related to the third method.

FIG. 1 schematically illustrates the prior art process of producing a Lenticular image by direct exposure: Lenticular sheet 110 with laminated photosensitive material 111 is loaded onto an imaging engine (in this example a flatbed scanner) with the photosensitive material 111 facing the imaging lens 120. The curved surface Lenticular lenses 112 are oriented toward the Z-axis, opposite to the lens 120. The lens 120 is stigmatic, i.e. having the same focal position in both directions X and Y and coinciding with the surface of the photosensitive material 111.

An important step in producing a high-quality Lenticular image is the proper alignment of the image slices 113 relative to the lens 112. This is a difficult and time-consuming process, which is the subject of many patents, including U.S. Pat. Nos. 5,424,553, 5,959,718 and 6,486,937 to Morton.

DETAILED DESCRIPTION OF PREFERRED EMBODIMENTS

The present invention provides a solution to the alignment problem between the image slices and the lens in a lenticular printing system, thus providing a solution for producing high-quality, high-resolution lenticular images.

Figure 1:
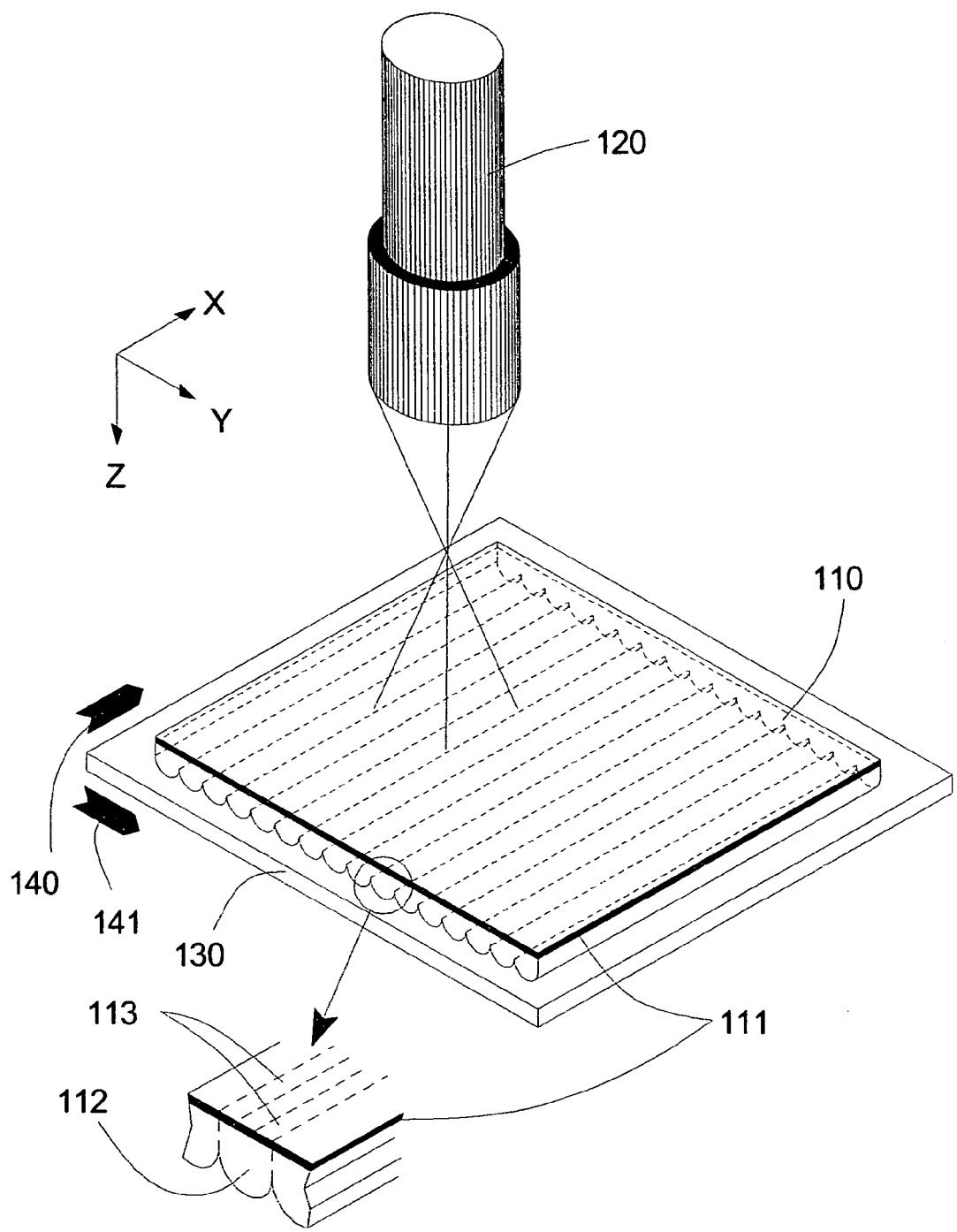
FIG. 1 is a schematic illustration of a prior art device for imaging Lenticular images.
Figure 2:
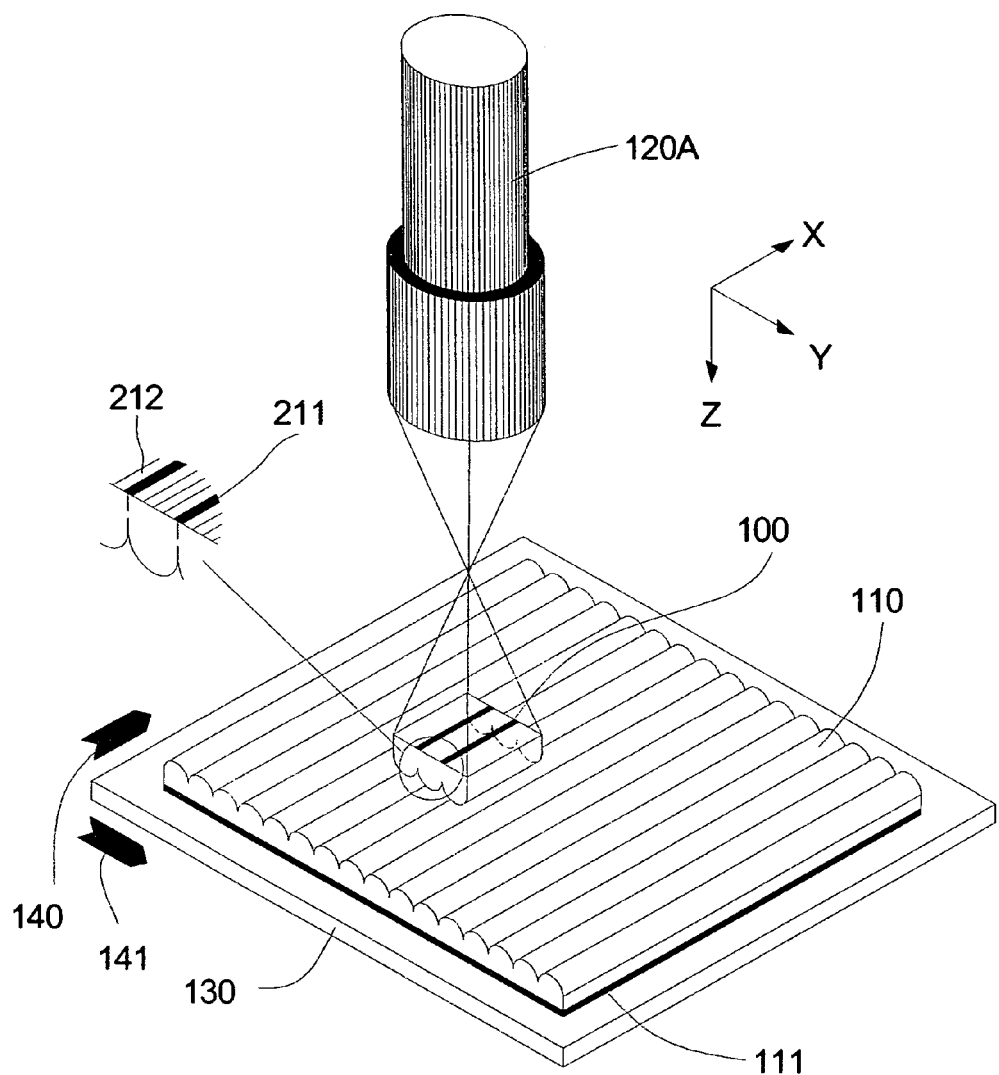
FIG. 2 is a schematic illustration of a flatbed device for imaging Lenticular images according to the present invention utilizing SLM-based projection system.
Figure 3:
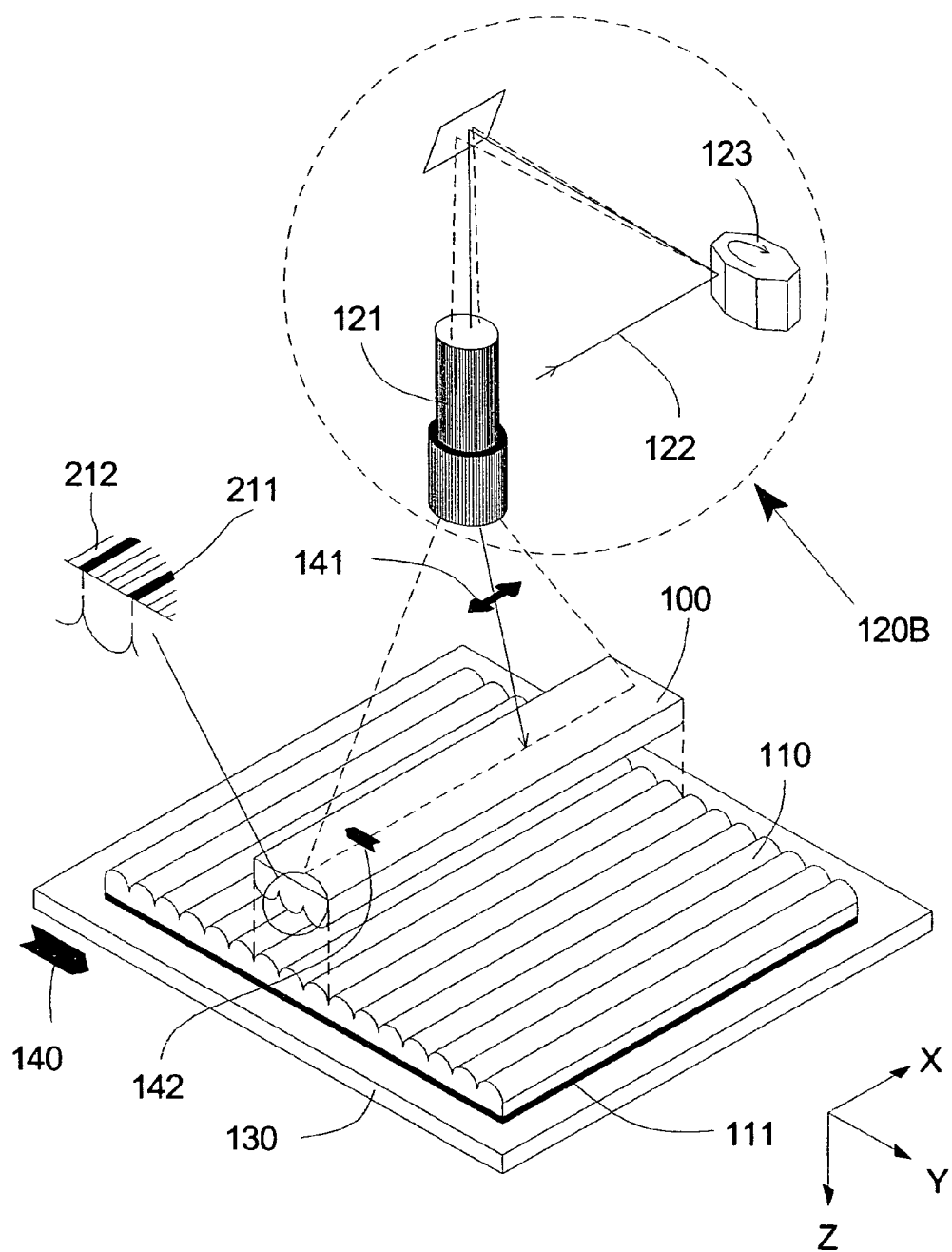
FIG. 3 is a schematic illustration of a flatbed device for imaging Lenticular images according to the present invention utilizing a laser scanning imaging system.
Figure 4:
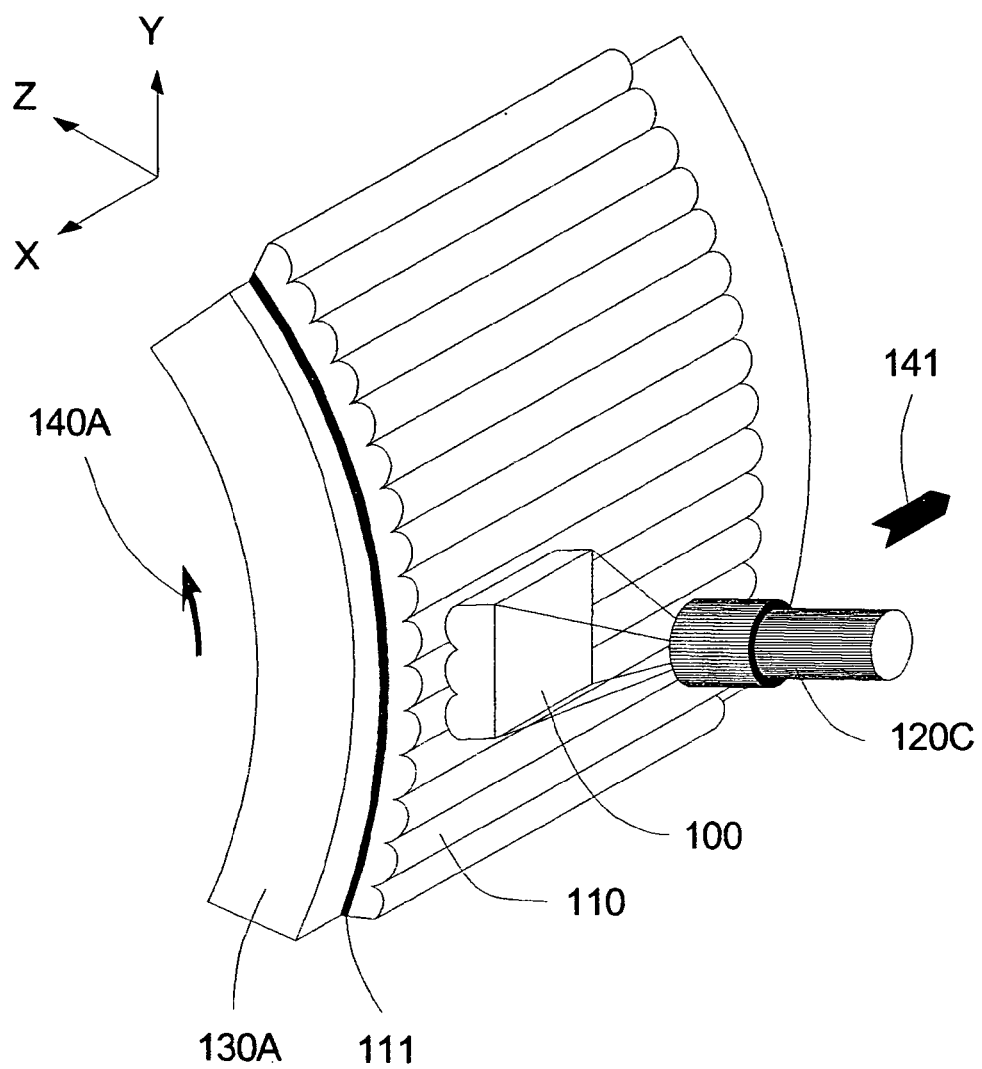
FIG. 4 is a schematic illustration of an external drum device for imaging Lenticular images according to the present invention utilizing SLM-based projection system.

FIGS. 2 through 4 illustrate different systems for embodying the present invention. All the embodiments use a lenticular sheet 110 (such as the 100 dpi lenticular sheet available from LPC America, Inc., Chicago Ill.) and photosensitive material 111, such as photographic emulsion, Cycolor film, available from Cycolor Inc., etc. All the embodiment use standard imaging engines.

FIG. 2 is a schematic illustration of a flatbed scanning system combined with a SLM-based projection system 120 (SLM=Spatial Light Modulator). Flatbed imaging systems are well known in the graphic arts industry (e.g. Dainippon Screen Katana FT-R 5040). In a flatbed imager the photosensitive medium is placed on a planar table. A sophisticated mechanical system may provide relative movement in both perpendicular direction between the imaging beam and the planar table. As an example of SLM-based projection system one can take any contemporary digital photo-finishing machine such as AGFA d-lab.1. The Lenticular material 110, with laminated photosensitive medium 111, is mounted on a flatbed carrying table 130. The projection system 120A illuminates a certain square or rectangular area of the Lenticular sheet with a pattern according to the imaged data. The spatial modulation is achieved with a SLM (not shown) inside the projection system 120A. The arrows 140 and 141 indicate the relative movement of imaging head 120A and table 130. The imaging can be done by a short light flash via the SLM or by keeping the image steady above the media.

The present invention uses an additional lens array 100 through which the imaging is performed. Lens array 100 is attached to imaging engine 120A and can actually be an integral part of it. In other words the relative movements 140 and 141 are identical for the imaging engine 120A and the array 100. The enlarged part presents the distribution of image slices 212 and "blind zones" 211, as will be explained below.

FIG. 3 is a schematic illustration of another embodiment of a system comprising the present invention. The system comprises a flatbed system utilizing a laser-scanning device. The working principles of the laser-scanning imager are utilized in any laser printer and are well known to the skilled in the art. The Lenticular material 110 with laminated photosensitive medium 111 is mounted on a flatbed table 130. The imaging head 120B consists of a laser source (not shown), which produces a beam 122, scanning polygon 123, and f-theta lens 121. Such system configuration excluding the lens array 100 is well known in the art. In FIG. 3 the arrow 140 illustrates the relative movement between the imaging head 120B and the table 130 in Y-axis direction, while arrow 141 shows the laser beam scanning direction. The lens array 100 moves in direction 140 together with the Lenticular sheet 110. The laser beam scans the aperture of 100 by means of polygon 123 in X-direction and the relative movement 140 in Y-direction. When the laser beam reaches the end of aperture of array 100 the array jumps back in Y-direction (142) by the number of lenses it consists of and the scanning starts again.

Similar to the flatbed systems of FIGS. 2 and 3 is the external drum system of FIG. 4. The only difference is that the Lenticular sheet 110 is wrapped around rotating drum 130A. The relative movement along the Y-axis is replaced by rotation around the drum axis indicated in FIG. 4 by numeral 140A. The optical imaging engine 120C can be of SLM-projection type like in the system of FIG. 2, or of laser-scanning type like in the system of FIG. 3.

According to the present invention, as shown in FIGS. 2 through 4, the imaging is performed through the Lenticular sheet 110.

Lens array 100 comprises a plurality of lenses having power only in one direction. The lenses may be cylindrical or semi-cylindrical or have non-zero aspherical coefficients in the sag determining equation.

The imaging apparatus 120A through 120C is astigmatic, with different focal plane positions in the direction of X-axis and Y-axis.

Figure 5:
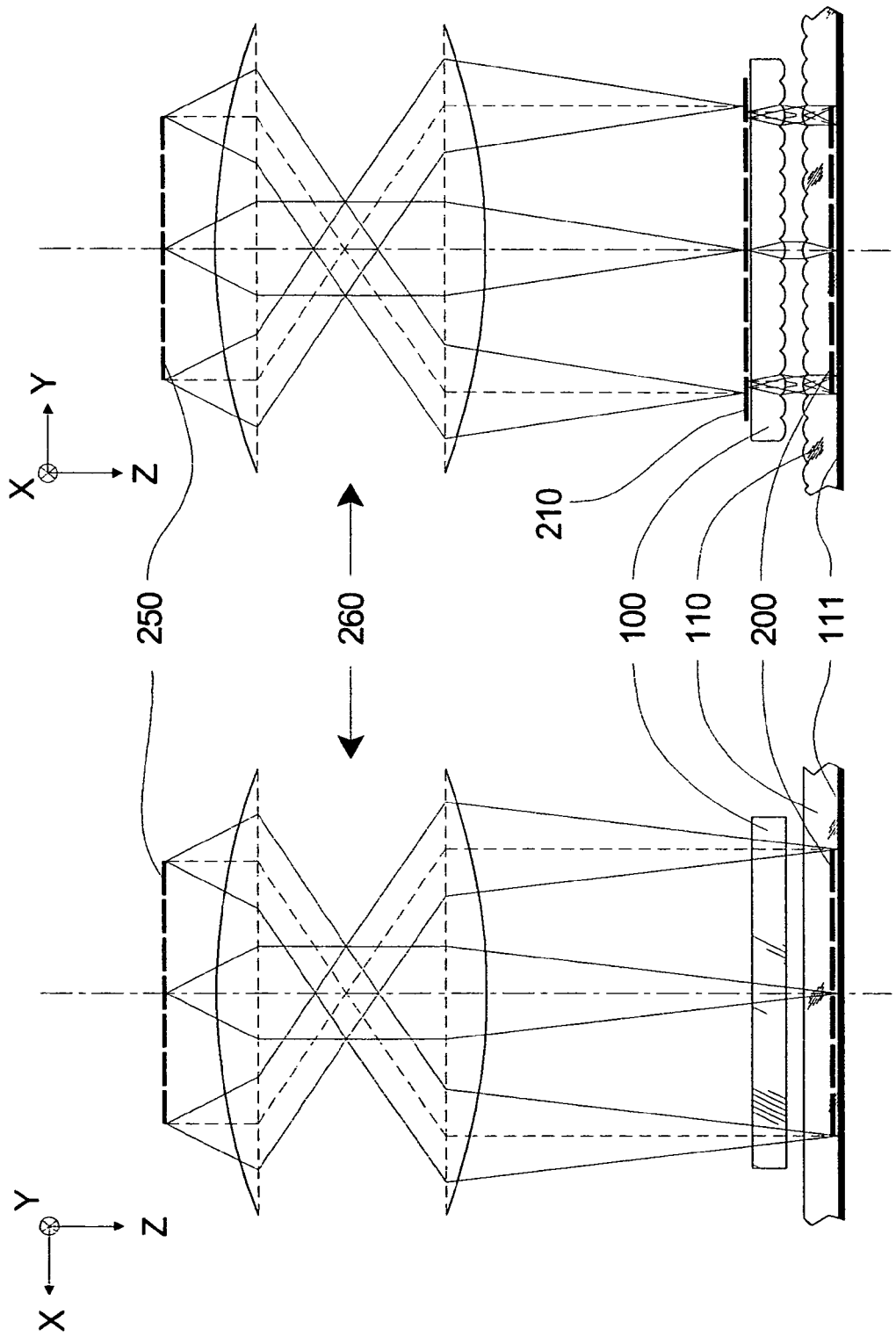
FIGS. 5a and 5b are schematic illustrations of the optical system according the present invention in Lenticular and cross-Lenticular directions respectively.

The performance of the optical system will now be explained with the help of FIGS. 5 through 7. For simplicity and definiteness, the example of a flatbed imaging engine utilizing SLM projection system will be considered. It is appreciated that this approach can be easily transferred to laser scanning systems or systems with drum-mounted medium.

FIGS. 5a and 5b schematically illustrate the optical performance of the disclosed invention by showing the beams propagation in two perpendicular planes: FIG. 5a—plane X-Z parallel to the Lenticular lenses, and FIG. 5b—plane Y-Z perpendicular to the Lenticular lenses. In both figures, for simplicity, the system illuminating the SLM 250 is not shown. Lens 260 images the SLM 250 on the photosensitive material 111 laminated on the backside of the Lenticular sheet 110. The focus position of lens 260 is different in directions X and Y: in X-direction the SLM image 200 is on the photosensitive material 111, while in Y-direction (the direction in which the Lenticular lenses 110 and the additional lens array 100 have power) there is an intermediate image 210 above (or within) the lens array 100. The conjugated surfaces of the system Lenticular lens 110 and the lens array 100 in Y-direction are the surfaces 210 and 200. In other words, in Y-direction plane 200 is an image of plane 210 through the lenses 100 and 110.

More detailed description of the optical performance of the lens pair 100-110 will be made with reference to FIG. 6. As was already explained, the astigmatic imaging lens 260 (FIGS. 5a, 5b) produces an intermediate image 210 in Y-direction. This image coincides with the focal plane of lenses L1 of the lens array 100. This means that each point of the image 210 will produce after the lens L1 a collimated beam 221. The angle between this collimated beam and the optical axis 222 of any individual lens L1 of the array 100 depends on the position of the point emitting this beam relative to the center of the lens L1 aperture. For obtaining the desired Lenticular effect, the focal plane of the Lenticular lenses L2 is at the backside of the Lenticular sheet 110. Therefore, each point of the intermediate image 210 has its conjugate on the final image 201.

Figure 6:
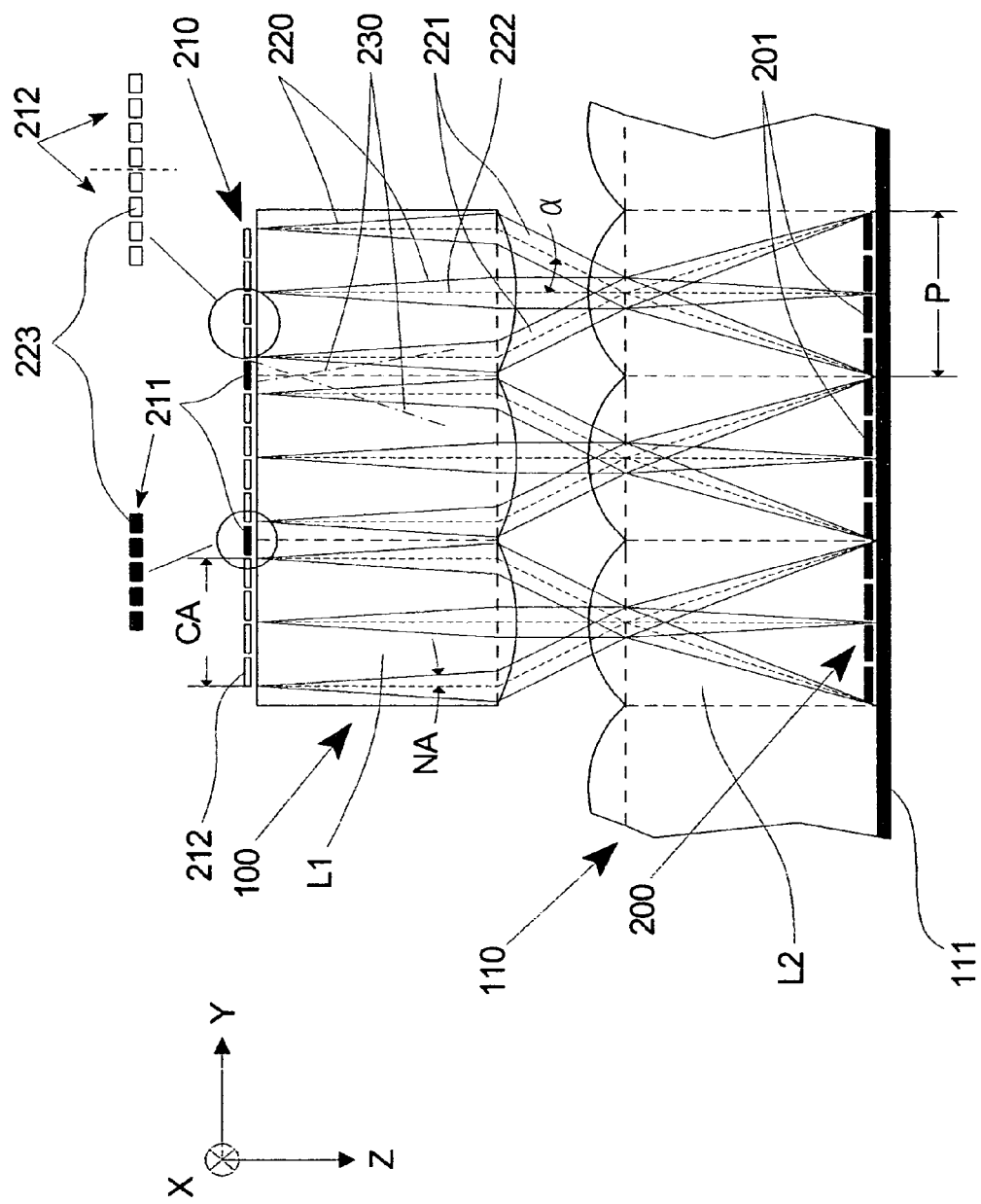
FIG. 6 illustrates the optical performance of an imaging system according to the present invention.

In FIG. 6 the different slices of the Lenticular image are designated by 212 in the intermediate image 210 and by 201 in the final image 200. These slices are built-up from images 223 of the SLM's pixels (or for this matter from dots produced by the scanning laser beam).

The pitch of the cylindrical lenses L1 in the array 100 is equal to the pitch P of the Lenticular lenses L2. From FIG. 6 it is clear that there will be an optical crosstalk between the lenses L1 (rays 230). In order to avoid this crosstalk the used part of the aperture of the lens L1 (designated by CA) can be made smaller than the lens pitch. The intermediate image 210 of FIG. 6 consists of image slices 212 and "blind zones" 211. The latter are needed to avoid optical crosstalk between the lenses. These are actually images of permanently closed pixels of the SLM (or in the case of laser scanning engine—scan lines with permanently closed laser). The crosstalk generally depends on the focal length of the lens L1 and the numerical aperture of the beam NA and should be calculated for every specific optical configuration. For example, if the focal length of L1 equals its thickness (in this case the intermediate image 210 is on the upper surface of the array 100) then $CA = P - 2 \cdot f_1 \cdot n_1 \cdot NA$, where $f_1$ is the focal length of L1 and $n_1$ is the refractive index of its material. Taking into account that the magnification in Y-direction should be $$M = \frac{P}{CA} = \frac{f_2}{f_1}$$

one can calculate the required focal length $f_1$ and CA of lens L1 (the focal length $f_2$ and P are known data of the Lenticular sheet).

Lens combination L1-L2 produces an inverse image in Y-direction, i.e. the order of the image slices in Y-direction is reversed as well as the information within a particular slice. Therefore, the information which is conveyed to a particular L1-L2 pair should be correspondingly arranged in reverse order in Y-direction.

The above explanations and formulas are based on paraxial approximation for lenses L1 and L2. They can be used as an initial guidance in designing and optimizing the real optical system in any specific configuration. If lens L2 is part of an off-the-shelf commercially available Lenticular sheet, the designer can experiment only with the parameters of lens L1.

Figure 7C:
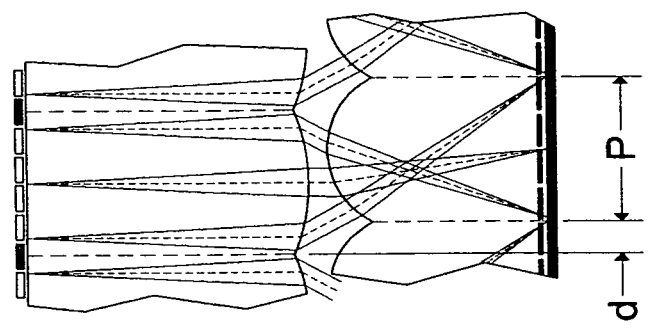
FIGS. 7b and 7c illustrate the optical performance of the system of FIG. 7a at different cross-Lenticular misalignments between the medium and the imaging head.
Figure 7B:
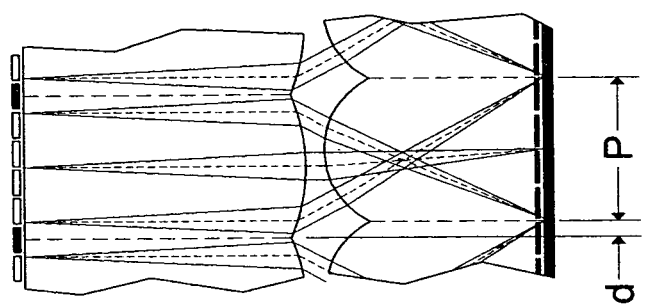
Figure 7A:
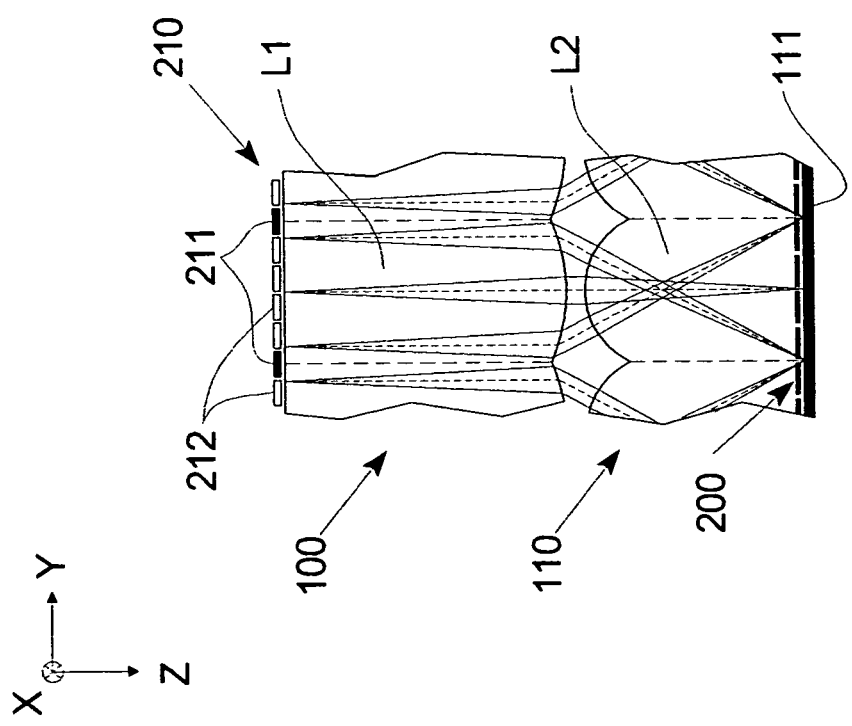
FIG. 7a illustrates the optical performance of a 140-lpi Lenticular system according to the present invention.

FIG. 7a illustrate results of such optimization of a real optical system for a Lenticular lens with pitch P=7 mil (141 LPI–Lens Per Inch) and thickness 0.27 mm of polycarbonate. The optimization results for lens L1 give: Material CLEARTRAN (ZnS); Powered surface: Even asphere with radius R=0.022 mm, Conic coefficient C=-1.012, and Second and Forth order terms equal to 20.42 and -123.42 respectively.

FIGS. 7b and 7c illustrate the performance of the optimized optical system when an alignment shift in Y-direction is present.

According to the present invention, the imaging system's tolerances are much higher compared with conventional system. For example, in high quality Lenticular prints, the relative accuracy of the pixel placement should be around ±3 μ. The proposed invention enables to use mechanical tolerances of a magnitude lower and still achieve the required placement accuracy.

The invention claimed is:

1. A method of producing lenticular images, comprising the steps of:
   providing photosensitive material;
   providing a lenticular sheet in contact with said photosensitive material;
   exposing said photosensitive material through said Lenticular sheet, wherein said step of exposing comprises using an optical imaging system to expose said photosensitive material through an additional lens-array comprising lenses having power only in one direction; and
   wherein the optical imaging system has focal planes different in directions perpendicular and parallel to the lenticular sheet lenses.

2. The method of claim 1, wherein the lenses of said additional lens-array are cylindrical.

3. The method of claim 1, wherein the lenses of said additional lens-array are semi-cylindrical.

4. The method of claim 1, wherein the lenses of said additional lens-array have non-zero aspherical coefficients in the sag determining equation.

5. The method of claim 1, wherein the optical imaging system produces an image coinciding with the plane of the photosensitive material in the direction along the lenticular sheet lenses and an intermediate image within, on, or above the additional lens array in the direction perpendicular to the lenticular sheet lenses.

6. The method of claim 5, wherein the focal plane of the optical imaging system in the direction perpendicular to the lenticular sheet lenses is conjugate to the plane of the photosensitive material relative to each pair of lenticular sheet lens and additional lens.

7. The method of claim 5, wherein the focal plane of the additional lens array coincides with the intermediate image.

8. The method of claim 1, wherein the pitch of the additional lens array is substantially the same as the pitch of the lenticular sheet lenses.

9. The method of claim 1, wherein only part of the physical aperture of the additional lens array is used for reducing optical crosstalk.

* * * * *